Aug. 16, 1966     G. SPIRA ETAL     3,266,944
HERMETICALLY SEALED THERMOELECTRIC GENERATOR
Filed Dec. 3, 1963     4 Sheets-Sheet 1
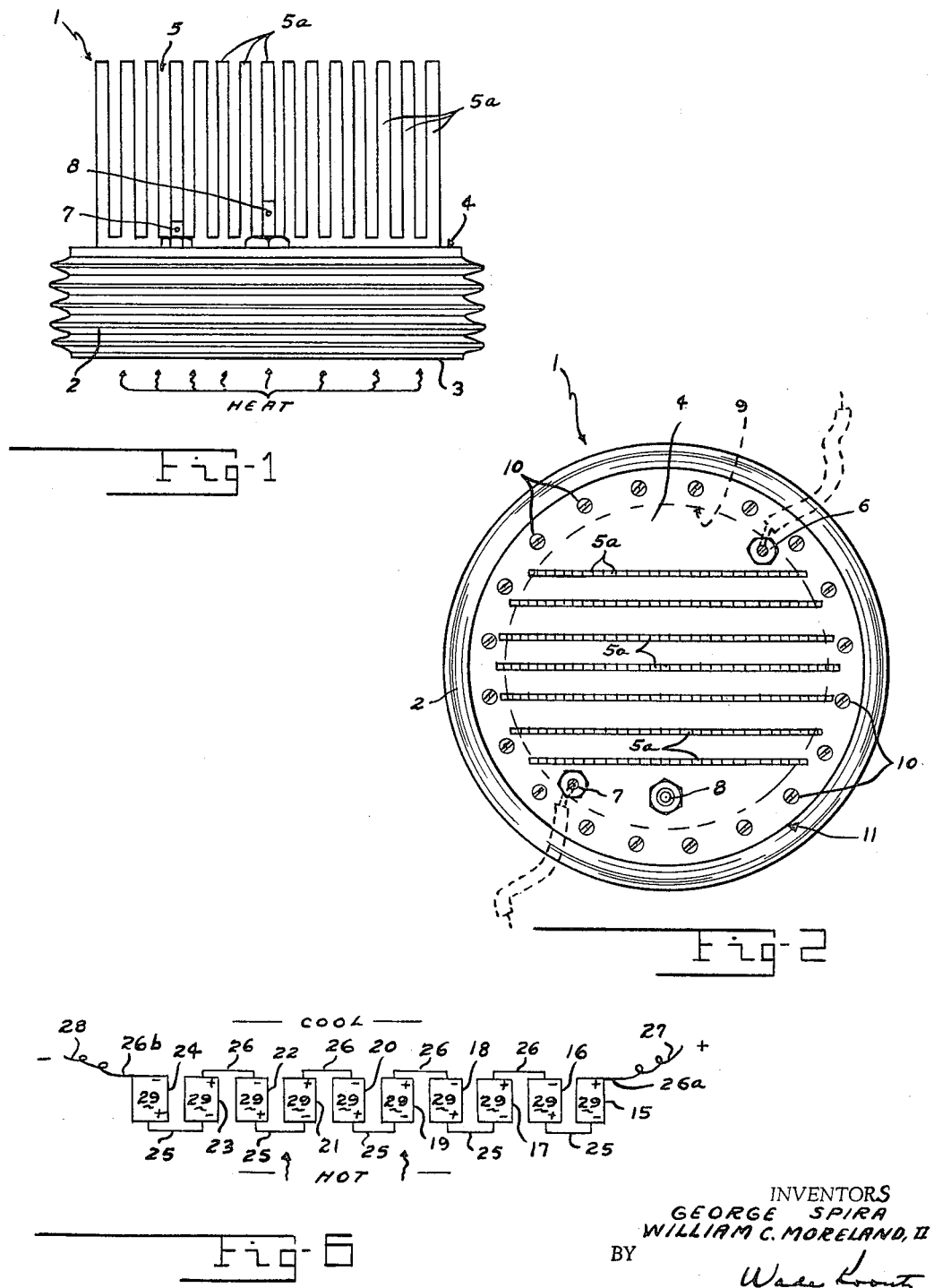
INVENTORS
GEORGE SPIRA
WILLIAM C. MORELAND, II
BY
ATTORNEYS

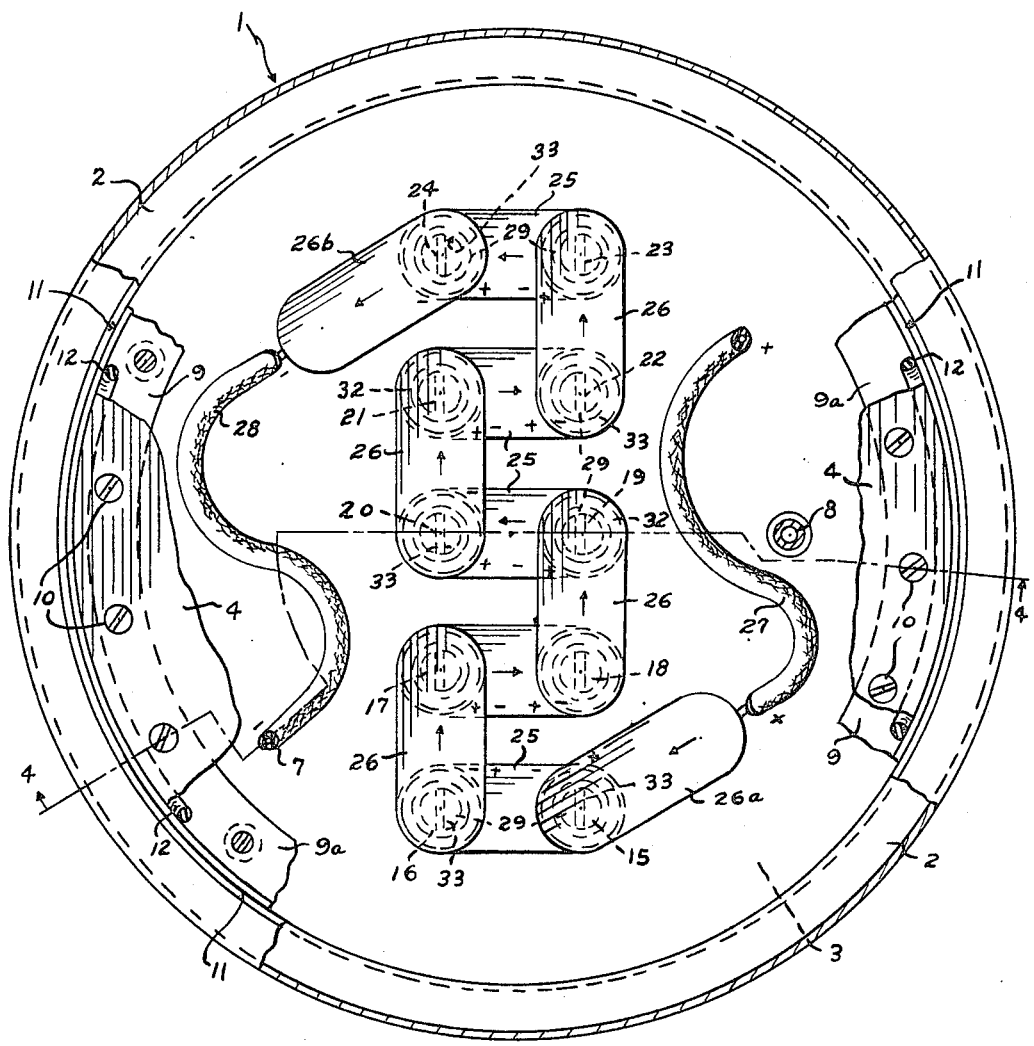

Aug. 16, 1966  G. SPIRA ETAL  3,266,944
HERMETICALLY SEALED THERMOELECTRIC GENERATOR
Filed Dec. 3, 1963  4 Sheets-Sheet 3

INVENTORS
GEORGE SPIRA
WILLIAM C. MORELAND, II
BY
ATTORNEYS

3,266,944
HERMETICALLY SEALED THERMOELECTRIC GENERATOR

George Spira, Sarasota, Fla., and William C. Moreland II, Export, Pa., assignors, by mesne assignments, to the United States of America as represented by the Secretary of the Air Force
Filed Dec. 3, 1963, Ser. No. 327,849
7 Claims. (Cl. 136—221)

This invention relates to thermoelectric generators for generating electrical current or power from heat or thermal energy, and more particularly to a hermetically sealed unit which is light in weight and small in volume with high heat transfer efficiency, having for an object the provision of a unit having good hermetically sealing property which is simple in construction and assembly and adaptable for utilization with heat from a variety of heat sources and in addition the provision of a modular construction which is flexible and positive with a material reduction of thermal stresses therein during variation in the application of heat and temperature changes during the operation thereof.

A further object includes a hermetically sealed unit having a plurality of TE (thermoelectric) elements therein connected in series with spring means for yieldably maintaining the "hot" and "cold" terminals thereof in positive heat exchange relation in the unit.

A further object includes an annular unit having a "hot" plate closure at one end thereof for contact with a heat source and a "cold" plate at the opposite end with an annular bellows therebetween and hermetically sealed thereto, including a plurality of TE elements connected in series therein and spring means in the TE elements for yieldably holding the units in good heat exchange relation between the "hot" and "cold" plates during expansion or contraction of the bellows and the elements.

A further object includes the provision of air-cooled heat exchange radiator means projecting outwardly away from the cold plate for reducing or controlling the temperature thereof during operation of the device.

A further object includes the provision of thermal insulation surrounding the TE elements and covering the "hot" plate and a sealing layer of high-temperature silicon rubber compound or the like covering the thermal insulation to hold the same and the TE elements in place and prevent heat leakage between the thermoelectric elements, whereby closer spacing of the thermocouple elements therein may be provided without loss of efficiency, and in addition the provision of valve means in the "cold" plate for charging the unit between the sealing layer of rubber compound and the "cold" plate for introducing and/or circulating an inert or reducing atmosphere or fluid in the interior of the unit to prevent oxidation and other chemical reactions to minimize the deterioration or oxidation of the thermoelectric materials of the TE elements.

A still further object is the provision of a thin dielectric layer or coating on the inner facing sides of the "hot" and "cold" plates, such as "mica paper," to electrically insulate the opposite contacting ends of the thermoelectric elements and the pressure spring means from the plates.

A further object is the provision of a hermetically sealed thermoelectric generator which is capable of operation at a temperature of at least 600° C. and with conventional thermocouples with a corresponding "cold" side heat exchange temperature up to about 200° C., with the elimination of thermal stresses on the thermocouple elements during expansion or contraction of the unit during any "hot" and "cold" temperature changes thereof.

Other objects and advantages of the invention will become apparent in the following description and accompanying drawings in which like reference characters refer to like parts in the several figures of the drawings.

FIG. 1 is a side elevation of a hermetically sealed thermoelectric generator incorporating the invention;

FIG. 2 is a top plan view of the generator shown in FIG. 1;

FIG. 3 is an enlarged top plan view, parts being broken away and shown in section to better illustrate the interior thereof;

FIG. 6 is a schematic expanded view showing the circuit arrangement and thermocouple electrical circuit connections in series.

Figure 4:
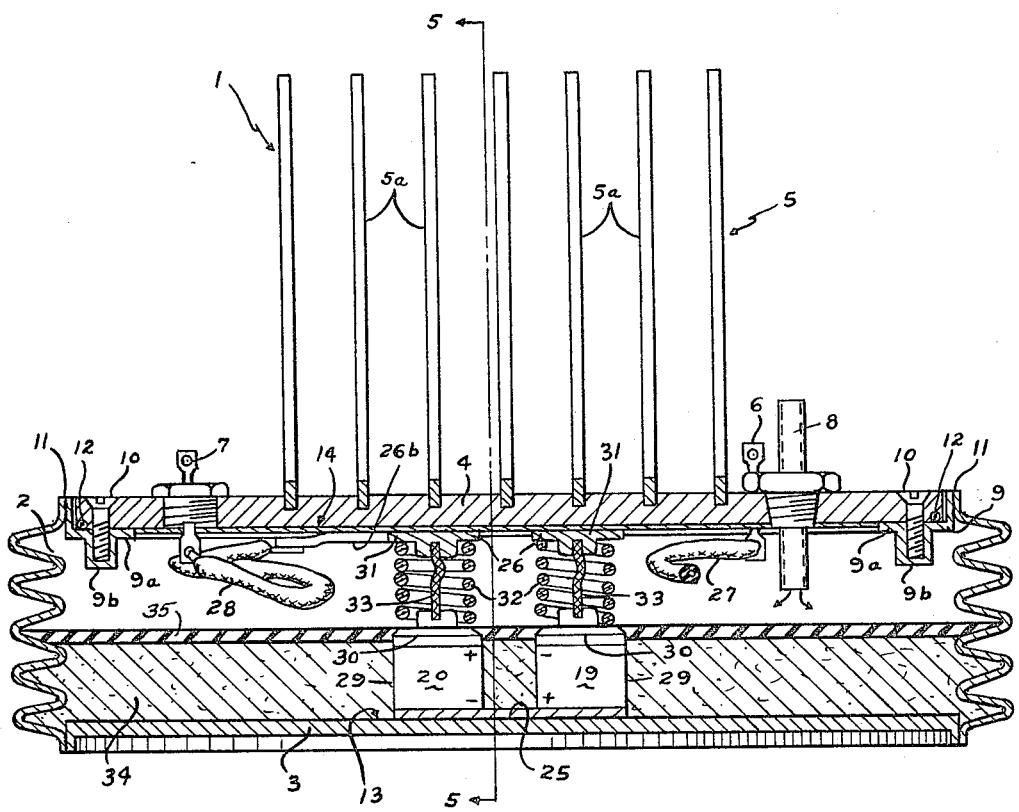
FIG. 4 is a vertical (angular) sectional view taken about on the planes indicated by line 4—4 in FIG. 3.

Referring to FIGS. 1 and 2, showing the exterior side and top elevation of one of the units involving the invention in which the unit is indicated generally by the reference numeral 1 and comprises a cylindrical, preferably metallic, bellows 2 having a bottom closure plate 3 subject to the application of heat, hereafter called a "hot" plate, and a top, preferably aluminum, closure plate 4, hereafter called a "cold" plate, having a plurality of heat exchangers 5 imbedded therein with comb-like fingers, or fins, or rods 5a projecting outwardly therefrom in spaced parallel relation to each other to provide heat dissipating means for keeping the upper plate 4 cool.

As shown the heat exchanger 5 provides air cooling means for the upper or outer plate 4, although it is contemplated that the heat exchanger 5 could be liquid cooled since the current generator elements are hermetically sealed between the opposite ends of the bellows 2 and the lower or "hot" plate 3 and the upper or outer "cold" plate 4. Spaced electrical terminals 6 and 7 extend through the outer "cold" plate 4 in insulated relation thereto, to which the TE generator series circuit is connected, inside of the unit.

In order to charge the sealed interior of the unit 1 with an inert gas to prevent deterioration of the thermocouples of the TE elements, a gas charging valve 8 is provided in the plate 4, with suitable check or cut-off means.

The outer plate 4 is removably but hermetically secured to an annular flange ring 9 around its periphery by a plurality of screw fasteners 10, best seen in FIGS. 2, 3 and 4, the outer edge of the flange ring 9 being welded or brazed at 11, with the inturned flange portion 9a provided with threaded bosses 9b for receiving the threaded ends of the fastening screws 10.

Suitable sealing means for hermetically sealing the periphery of the "cold" plate 4 to the inturned flange 9a is provided, for instance, such as an annular O ring 12.

Figure 5:
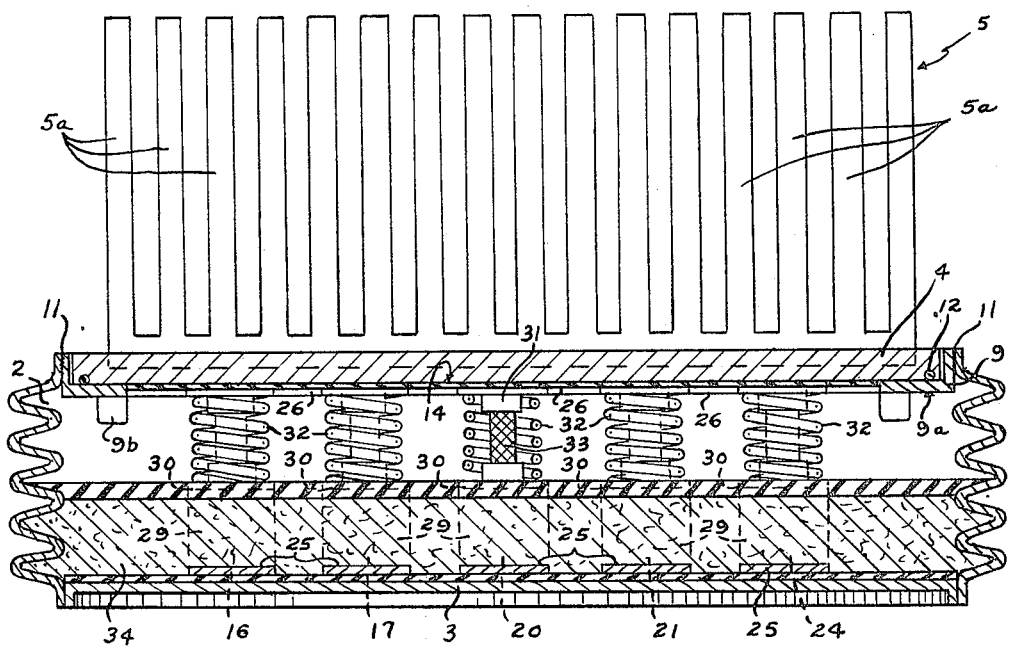
FIG. 5 is also a vertical sectional view taken about on line 5—5 in FIG. 4.

The inner facing surfaces of the bottom "hot" plate 3 and the upper "cold" plate 4 are each covered or coated with a suitable very thin electrical insulating layer or dielectric coating, indicated at 13 and 14, respectively, and best seen in FIGS. 4 and 5. These layers 13 and 14 may be cemented or otherwise secured to the aforesaid facing surfaces of the plates, preferably comprising thin sheets or layers of mica paper of around .003″ to .005″ in thickness. Thin insulating layers or coatings of aluminum oxide or glass may be substituted for the mica paper layers 13 and/or 14, is desired.

The belows 2 is preferably made from a thin (.007″) low thermal conductivity material, such as stainless steel, with multiple convolutions to reduce the heat conductivity from the "hot" plate 3 to the "cold" plate 4 to a minimum and provide for thermal expansion.

It should also be noted that the design as illustrated is round or cylindrical. However, the generators 1 can be manufactured in other sizes and shapes. For example, they can be rectangular or hexagonal so that a plurality of the single units 1 can be assembled compactly together to form large high-powered electric generators. When used as "building blocks" for large units, they can be easily replaced in case of failure.

The design lends itself to operation with a variety of heat sources. Generators of this general type can be operated where large amounts of waste heat are available, for example, boilers, furnaces, exhaust stacks, etc. They could be used as stand-by devices, or as additional sources of power. Also specially designed heat sources, either nuclear or fossil fuel, can be provided for their operation.

Referring back to the drawings, particularly FIGS. 3, 4 and 5, a plurality of thermoelectric elements, indicated generally at 15, 16, 17, 18, 19, 20, 21, 22, 23 and 24 are connected electrically in series intermediate the mica paper layers 13 and 14 to the insulated electric output terminals 6 and 7 in the "cold" plate 4 of the generating unit 1.

The elements 15 to 24 are connected in pairs, so to speak, by lower connecting plates 25 which are in thermal contact through the mica insulating sheet 13 with the inner surface of the "hot" plate 3 while the opposite ends are alternately connected by the plates 26 which are in thermal contact through the other mica coating 14 with the "cold" plate 4, the outer, or end, TE elements 15 and 24 being connected by the plates 26a and 26b through the electrical conductors 27 and 28 to the insulated terminals 6 and 7 in the plate 4.

The TE or thermoelectric elements are substantially identical, each comprising a standard or well known conventional thermocouple of the usual dissimilar metals, indicated generally at 29 in the stacks 15 to 24, the alternate thermocouples in the series being reversed or inverted so as to provide the proper arrangement for the plus and minus connections for the series circuit hook-up as contemplated and illustrated, each one being secured at one end to each end of one of the bottom or "hot" plate contacts or straps 25, for heat exchange relation with the "hot" plate 3 through the mica paper 13, substantially as shown. The opposite end of each thermocouple 25, whether the positive or negative end thereof as necessary, is disposed substantially in a mid-plane between the plates 3 and 4 and carries a spring seat contact disk 30 in intimate heat exchange relation, while the end portions of the plate connector 26 carry similar spring seating contact portions 31 between which the compression coil springs 32 are mounted, thus exerting longitudinal expansion forces to a substantially predetermined degree on the thermocouple 29 to maintain the opposite ends of the TE elements 15 to 24 in best possible heat exchange relation relative with the respective "hot" and "cold" plates 3 and 4.

As seen best in FIGS. 4 and 5, a suitable flexible braid or conductor 33 maintains positive electrical contact and heat exchange relation between the lower and upper spring seats 30 and 31 of each of the elements 15 to 24 in addition to the spring 32, during any thermal expansion or contraction of the surrounding bellows member, or the elements 15 to 24.

After the units have been assembled in their desired series-connected adjacent positions within the bellows 2, and, of course, before the plate 4 is sealed down in place, powdered potassium titanate, or other thermal insulation powder 34 is then firmly packed in the bellows over the hot plate 3 and around the TE elements, particularly the thermocouples 29, substantially as shown in FIGS. 4 and 5.

A layer of high temperature silicon rubber or the like 35 is then poured on top of the potassium titanate powder or granules 34 for the purpose of holding the powder in place.

To complete the assembly, the closure "cold" plate 4 is sealed in place by the O-ring and fasteners 10 after the leads 27 and 28 have been connected to their respective terminals 6 and 7 extending through the plate 4 and the mica paper layer 14. As previously mentioned, the packed-in thermal insulation powder surrounding the sides of the thermocouple retards any heat (or cold) transfer between the adjacent elements 15 to 24 of the group, thus permitting a much closer assembly of the same within the enclosing bellows 2 than would otherwise be possible without the thermal insulating powder, without reducing the efficiency of the unit. Therefore, more elements, such as 15 to 24, can be employed in each unit, thus producing greater electrical power output per unit. The insulation layer 34 also reduces heat transfer by radiation from the "hot" plate 3 to the "cold" plate 4 thus maintaining a better hot-to-cold differential on or between the opposite ends of the thermocouples 29 during the operation of the unit, or units.

A particular embodiment of the invention has been shown and described to the best understanding thereof. However, it will be apparent that changes and modifications in the arrangement and construction of the parts thereof may be resorted to without departing from the true spirit and scope of the invention as defined in the following claims.

We claim:
1. A thermoelectric generator unit having a hermetically sealed chamber comprising first and second spaced parallel metallic end plates and an annular metallic bellows hermetically sealed at its opposite ends to the peripheries of said first and second plates to provide said hermetically sealed chamber therein, said first plate being subject to the application of heat to raise the temperature thereof, a heat exchanger fixed to the outer surface of said second plate relative to said chamber in heat exchange relation thereto, for dissipating heat from said second plate and said bellows to provide a differential temperature between said plates, a plurality of extensible thermoelectric elements disposed in parallel closely spaced insulated relation to each other electrically connected in series, each having a thermocouple element therein with one end in heat exchange relation with the first plate and its opposite end in "heat" exchange relation with the second plate, insulated electrical output terminals fixed in spaced relation to each other in sealed relation in said second plate, electrical conductor means in said chamber connecting the ends of the series electrical circuit of said thermoelectric elements to said terminals, spring means in each of said thermoelectric elements for yieldably urging the opposite ends thereof respectively into heat exchange relation to the facing inner surfaces of said first and second plates, and means carried by said first plate for introducing an inert atmosphere into said chamber to minimize the deterioration of the thermoelectric material in said thermoelectric elements due to oxidation and other chemical reactions thereon.

2. A thermoelectric generator unit as set forth in claim 1 including a material thickness of thermal insulating powder packed in said chamber to cover said first plate and surround said thermoelectric elements in contact with the inner periphery of said bellows, for materially reducing heat transfer between said plates and the opposite ends of the bellows and between said thermoelectric elements during operation of the generator.

3. Apparatus as set forth in claim 2 in which said thermal insulating powder comprises powdered potassium titanate covering said first plate and surrounding and protecting the thermocouples of said thermoelectric element to a height between said plates substantially equal to half the space between the adjacent facing surfaces thereof.

4. A hermetically sealed thermoelectric generator unit as claimed in claim 3 including a layer of high temperature silicon rubber completely covering the top of said packed thermal insulating powder in sealing contact with the inner periphery of said bellows and said thermoelectric elements for holding said powder in place and sealing off a portion of said chamber adjacent said first plate from the portion of the chamber adjacent the second plate.

5. A thermoelectric generator unit having a hermetically sealed chamber therein comprising first and second parallel spaced end plates and an annular bellows member hermetically sealed around the peripheries of its opposite ends to the peripheries of said first and second plates to provide said sealed chamber, said first plate being subject to the application of heat to the outer surface thereof relative to the chamber, to raise the temperature thereof, a heat exchanger fixed to the outer surface of said second plate relative to the interior of said chamber for dissipating heat from said second plate and said bellows to increase the temperature differential between said plates, a plurality of elongated thermoelectric elements positioned in said chamber in spaced parallel relation to each other peripendicular to said plates, electrical circuit means connecting said thermoelectric elements together in series, each of said thermoelectric elements having one end thereof in heat exchange relation with said inner surface of said first plate and the opposite end thereof in heat exchange relation with said second plate, relatively insulated electrical output terminals fixed in said second plate, electrical conductor means in said chamber connecting the electrical output ends of the electrical series circuit including said thermoelectric elements to said terminals, resilient means intermediate the opposite ends of each of said thermoelectric elements for yieldably urging the opposite ends thereof respectively into heat exchange relation with the facing inner surfaces of said plates in said chamber.

6. A thermoelectric unit as set forth in claim 5 including a thermal insulating powder packed in said bellows to a thickness extending from said first plate to a plane substantially midway between said plates parallel thereto, and in surrounding relation to said thermoelectric elements, and an insulating rubber layer covering said powder in sealed relation to the interior annular surface of said bellows to provide a sealed area between said layer and said second plate, and means for introducing an inert fluid medium into said sealed area during the operation of said generator to prevent deterioration and oxidation of said thermoelectric elements.

7. A thermoelectric generator unit comprising an annular extensible bellows member, a first "hot" closure plate welded at its periphery around the periphery of one end of said bellows member, an annular "cold" plate supporting flange projecting inwardly in sealed relation from the opposite end of said bellows member, an annular "cold" plate removably sealed to said annular flange in spaced parallel relation to said "hot" plate, forming a hermetically sealed chamber within said bellows member between said plates, heat exchange radiator means fixed to the outer surface of said "cold" plate to dissipate heat therefrom to maintain a temperature differential between said plates, thin electrical insulating coatings covering the inner facing surfaces of both of said "hot" and "cold" plates, a plurality of rows of spaced parallel thermoelectric elements each extending between said plates perpendicular thereto, electrical heat exchange conductor thermoelectric element supporting end plates alternately electrically connecting the opposite ends of said thermoelectric elements in series, with said electrical conductor supporting end plates in contact with said insulating coatings arranged alternately in "hot" and "cold" temperature transfer relation respectively with said "hot" and "cold" plates, spring means in each of said thermoelectric elements for yieldably extending said elements to maintain said "hot" and "cold" temperature transfer relation, thermocouple means in said thermoelectric elements in alternate reverse relations to maintain said series electrical circuit through said thermoelectric elements, including braided flexible metallic connectors within said spring means connected electrically between said electrical connector supporting plates adjacent said "cold" plate and the thermocouple means in said thermoelectric elements terminal electrical conductors connected to the thermoelectric element supporting plates at the opposite ends of the aforesaid series connected circuit, spaced insulated electrical output terminals sealed in said "cold" plate and connected to said terminal electrical conductors, and projecting outwardly from the exterior surface of said "cold" plate, a thermal insulating powder packed in said bellows in firm contact with the interior thereof, enclosing the thermocouple members and covering said "hot" plate and the thermoelectric element supporting and connecting plates between the thermoelectric elements located adjacent said "hot" plate for reducing heat transfer between said rows of thermoelectric elements and between the thermoelectric elements in each row, and reducing heat transfer between said "hot" and "cold" plates, a layer of rubber material covering said powder in sealing relation to said thermoelectric element and the annular inner surface of said bellows to retain said powder in place, and provide a closed area between said layer and said "cold" plate and charging valve means in said "cold" plate for charging said area with an inert gas to reduce deterioration of the thermoelectric elements due to oxidation in which the flexibility of said bellows reduces stress on the powder and the thermoelectric elements which may be set up by differential thermal expansions.

References Cited by the Examiner
UNITED STATES PATENTS
3,129,116  4/1964  Corry _____ 136—4

WINSTON A. DOUGLAS, *Primary Examiner.*

KATHLEEN H. CLAFFY, *Examiner.*

A. BEKELMAN, *Assistant Examiner.*